April 29, 1924.

C. MUEHLEISEN 1,492,528

TYPOGRAPHICAL COMPOSING AND CASTING MACHINE

Filed March 8, 1923     2 Sheets-Sheet 1

Inventor.
Carl Muehleisen
By Rogers, Kennedy & Campbell
Attorneys

April 29, 1924.                                                    1,492,528
                          C. MUEHLEISEN
              TYPOGRAPHICAL COMPOSING AND CASTING MACHINE
                 Filed March 8, 1923      2 Sheets-Sheet 2
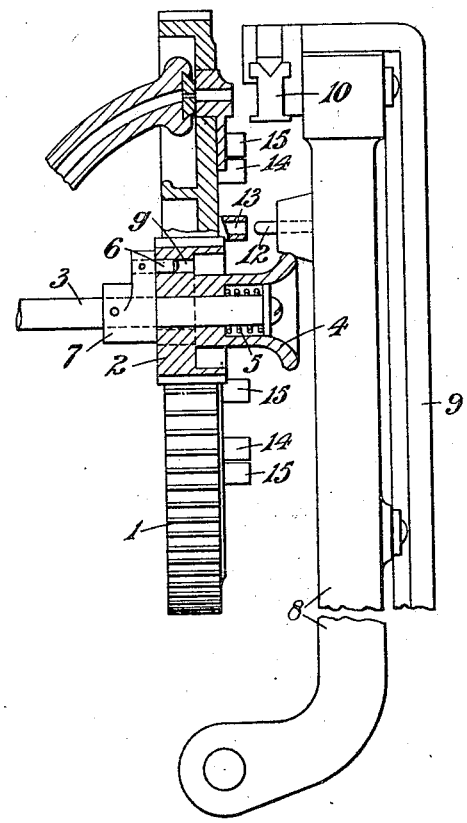

Patented Apr. 29, 1924.

1,492,528

UNITED STATES PATENT OFFICE.

CARL MUEHLEISEN, OF BERLIN, GERMANY, ASSIGNOR TO MERGENTHALER LINOTYPE COMPANY, OF BROOKLYN, NEW YORK.

TYPOGRAPHICAL COMPOSING AND CASTING MACHINE.

Application filed March 8, 1923. Serial No. 623,678.

*To all whom it may concern:*

Be it known that I, CARL MUEHLEISEN, a citizen of the United States of America, and residing at Sellerstrasse 13, Berlin, N. 39, Germany, have invented new and useful Improvements in or Relating to Typographical Composing and Casting Machines, of which the following is a specification.

This invention relates to the casting mechanism of typograpical line-casting machines, and has for its object to provide means whereby said machines can be adapted to accommodate on the mould carrier, a greater number of moulds than has heretofore been found practicable.

In typographical composing and line-casting machines in which the mould are mounted on a rotating disc or wheel, it is already known to provide a plurality of moulds and to present them alternatively in operative position. When making a change from one mould to another the mould wheel has to be turned independently of the main driving mechanism to such an extent that in place of the mould last used, the required substitute mould shall occupy the operative position. The mould wheel is provided with teeth on its periphery, gearing with a pinion connected to the main driving mechanism through a coupling comprising a pin and a hole, the toothed pinion being in the ratio of 1 to 4 relatively to the mould wheel. When with this arrangement, the said mould wheel is provided with two or four moulds there is no difficulty in effecting changes from one mould to another by disengaging the coupling of the toothed pinion and turning the mould wheel to the required extent of 90°, 180° or 270° according to the particular mould to be used. After the mould wheel has been so turned the coupling pin will always be axially aligned with the hole to receive it and consequently it can readily be re-inserted into that hole to re-establish operative connection between the mould wheel and the pinion shaft.

The foregoing arrangement, however, is entirely unsuitable for a mould wheel which carries 3, 5 or more moulds. With three moulds the mould wheel must be turned 120°, with 6 moulds 60° and so on in order to bring the next successive mould into operative position. In such cases, however, the coupling for the pinion, if constructed as ordinarily, would not permit of operative engagement because the pin would not be aligned with the hole. In arrangements of this character, therefore it has been necessary for the purpose of changing from one mould to the next following one, to disengage the connection between the mould wheel slide and its actuating lever, and thereafter to swing forward or open the so-called vise frame and pull the mould wheel forward out of engagement with the toothed pinion: the mould wheel is then turned to the required extent and is next pushed backward into engagement with the pinion.

This operation absorbs a considerable amount of time, and for that reason the employment of a number of moulds other than two or four is not practicable.

The present invention overcomes this difficulty by providing the toothed pinion with means whereby it can be coupled to its shaft not only after it has been turned one complete revolution but also, as required, after it has been turned one third, one quarter, one fifth or other fraction of a revolution. It also provides means, when the aforesaid increased number of moulds is employed, for preventing the mould next following that in operative position, from contacting with the first elevator when the latter supports the assembled line in front of the mould.

The invention will now be described by reference to the accompanying drawings which are to be taken as part of this specification and read therewith, and in which:—

Figure 2 is a vertical section of Figure 1 showing portions of the first elevator and vise frame.

Figure 1:
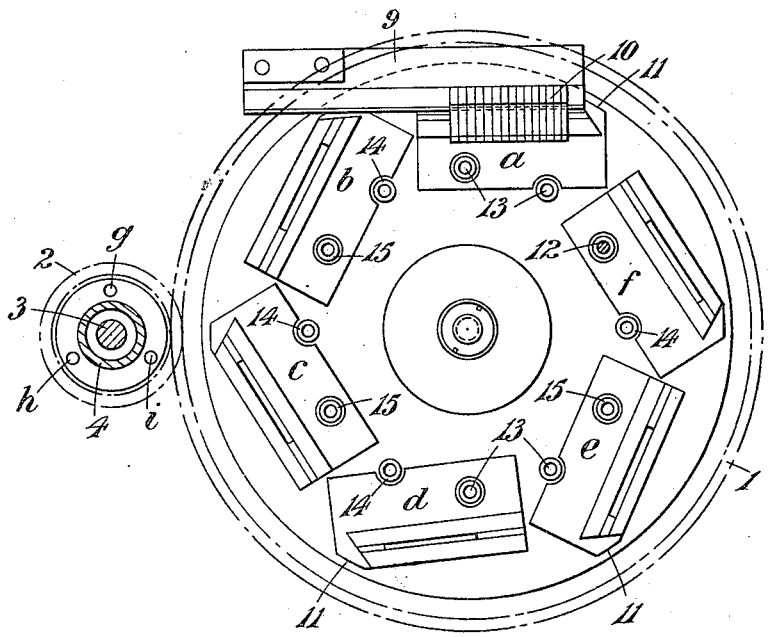
Figure 1 is a front elevation of one constructional form of the mould wheel and pinion the former, as an example, being shown as provided with six moulds.

In the constructional form represented in Figures 1 and 2, the mould wheel 1 is provided with six moulds *a*, *b*, *c*, *d*, *e* and *f*, and the toothed pinion 2 is consequently provided with three holes *g*, *h* and *i* at 120° apart. The pinion 2 is rotatably mounted upon its shaft 3 and is fitted with a knob 4 to permit of it being conveniently drawn forward in opposition to a spring 5 which normally holds the knob in its rearmost position, said spring bearing, at its rear end, against the bottom of a concentric recess in the knob, and, at its front end, against a collar fast to the shaft 3 all as shown clearly in Figure 2. When the pinion 2 is drawn forward as just explained, the hole $g$, $h$ or $i$, say for example $g$, is disengaged from a crank pin or coupling pin 6, which, as ordinarily, is fast to a crank arm 7 itself fast to the shaft 3, and consequently when said pinion is thus in its forward position, it can be freely turned upon its shaft through 120° or a multiple of 120° to bring one or other of the holes $h$, $i$, into axial coincidence with the pin 6 and one or other of the moulds $b$, $c$, $d$, $e$, $f$, into casting position.

In order to effect a change from one mould to the next, the mould wheel 1 must be turned 60°, after the pinion 2 has been disengaged from its shaft 3. If, as is the case in existing machines, the pinion be provided with only a single hole, it is necessary, as hereinbefore explained, to disengage the connection between the mould wheel and its slide (which latter is not shown in the drawings), and open the vise frame 8, on which, as ordinarily, is guided the first elevator 9 supporting the composed line of matrices 10 to enable the mould wheel 1 to be drawn forward out of engagement with the pinion 2. This pinion however, according to the present invention, has the three before mentioned holes $g$, $h$, $i$, and as the mould wheel 1 has four times as many teeth as has the pinion 2, it follows that if the mould wheel is turned 60°, the pinion will be turned 240°, and one of the holes will be presented to the coupling pin. Thus it is possible to change from one mould to another by drawing forward the pinion 2 until the respective hole is out of engagement with the pin 6, turning said pinion 240° and afterward releasing it so that the coupling pin 6 will again enter the particular hole then aligned with it, under the influence of the spring 5, as ordinarily, or otherwise.

Figure 3:
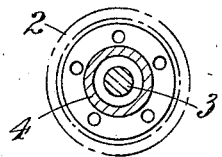
Figures 3 and 4 are front elevations of two further constructional forms of the mould wheel pinion arranged respectively for engaging in two and five coupling positions.
Figure 4:
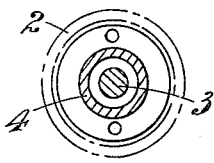

If another number of moulds, say for example, eight are used, two diametrically opposed holes in the pinion 2, as in Figure 3, will suffice. On the other hand, for a mould wheel carrying five moulds, it is necessary to have five holes distributed at regular intervals apart about the axis of the mould-wheel pinion 2, as in Figure 4, in order to enable the mould wheel 1 to be turned to the extent of a fifth of a revolution, and so on.

The somewhat restricted size of the mould wheel 1 renders it difficult to accommodate the relatively large number of moulds $a$, $b$, etc., which the present invention contemplates, because the moulds are packed so closely together, that the head of the first elevator 9, when supporting the matrices 10 in front of the mould, say $a$, then in casting position, would contact with the next following mould say $b$. It therefore becomes necessary to construct the moulds so that they will not contact with the elevator, as it would be impracticable to shorten the elevator for the reason that it would be too short to hold the required length of composed line of matrices.

For this reason, the present invention contemplates the chamfering as at 11 of the particular corner of each mould which would otherwise be caused to contact with the head of the first elevator 9, so that when the mould wheel 1 is advanced into casting position, no such contact will be made. By these means, when the elevator 9 reaches the position in which it is immediately in front of the uppermost mould it will, as shown in Figure 3, extend over, but without contacting with, the chamfered part 11 of the mould located to the left of it.

It is to be understood that the before described devices are capable of being modified without departing from the essential features of the invention, for example, instead of the before described pin and hole coupling, any other coupling means may be provided, it being essential, so far as concerns this coupling, only that the pinion can be coupled to its shaft in relatively different positions.

The locking of the mould wheel in its several casting positions, is effected by one or more steady pins 12 which engage sockets 13 on said wheel, there being as many of such sockets as are necessary to accommodate the steady pins in the several casting positions of the mould wheel, as shown in Figure 3. To permit the moulds to be placed in position on the mould wheel, they are provided, as shown in Figure 1, each with a recess 14 for accommodating the respective steady pin socket 13, in addition to the usual hole 15 for a similar purpose.

Having described my invention, I declare that what I claim and desire to secure by Letters Patent is:—

1. In a typographical composing and casting machine, the combination with a mould wheel adapted to carry a plurality of moulds, a driving pinion in engagement with the mould wheel, and a driving shaft, of means whereby the driving pinion may be coupled to and uncoupled from the driving shaft in different angular positions, and the said means permitting the driving pinion when uncoupled from the driving shaft to be rotated in either direction for changing from one mould to another.

2. In a typographical composing and casting machine, the combination with a mould wheel adapted to carry a plurality of moulds, a driving pinion in engagement with the mould wheel, and a driving shaft, of a coupling pin fast to the shaft and means adapted to engage the pin with the pinion in different angular positions of the latter.

3. In a typographical composing and casting machine, the combination with a mould wheel adapted to carry a plurality of moulds, a driving pinion in engagement with the mould wheel, and a driving shaft, of a coupling pin fast to the shaft and means adapted to engage the pin with the pinion in different angular positions of the latter varying in number according to the number of moulds which the mould wheel is adapted to carry.

4. In or for a typographical composing and casting machine, having a mould wheel adapted to carry a plurality of closely adjacent moulds, a mould chamfered to avoid contact with the first elevator head which overlies that mould when said head is in casting relationship with the next adjacent mould.

5. In a typographical composing and casting machine, the combination with a mould wheel adapted to carry a plurality of moulds and a first elevator the head of which overlaps a mould adjacent the one in casting position, of a mould chamfered to avoid contact with said overlapping head.

6. In a typographical composing machine, the combination with a mould wheel adapted to carry a plurality of closely adjacent moulds, and a plurality of steady pin sockets on the mould wheel adapted to retain said wheel in different positions, of a mould chamfered to avoid contact with the first elevator head which overlies that mould when said head is in casting relationship with the next adjacent mould, and provided with a plurality of cavities each for receiving a different steady pin socket.

In testimony whereof I have affixed my signature hereto.

CARL MUEHLEISEN.